United States Patent
Vincent et al.

(10) Patent No.: US 10,657,523 B2
(45) Date of Patent: May 19, 2020

(54) RECONCILING ELECTRONIC TRANSACTIONS

(71) Applicant: ARM IP Limited, Cambridge (GB)

(72) Inventors: Hugo John Martin Vincent, Cambridge (GB); Krisztian Flautner, Cambridge (GB); Amyas Edward Wykes Phillips, Cambridge (GB)

(73) Assignee: ARM IP Limited, Cambridge (GB)

( * ) Notice: Subject to any disclaimer, the term of this patent is extended or adjusted under 35 U.S.C. 154(b) by 1551 days.

(21) Appl. No.: 13/968,733

(22) Filed: Aug. 16, 2013

(65) Prior Publication Data
US 2015/0052066 A1  Feb. 19, 2015

(51) Int. Cl.
G06Q 20/38 (2012.01)
G06Q 30/06 (2012.01)
H04L 29/06 (2006.01)

(52) U.S. Cl.
CPC ....... G06Q 20/38215 (2013.01); G06Q 30/06 (2013.01); H04L 63/0478 (2013.01)

(58) Field of Classification Search
None
See application file for complete search history.

(56) References Cited

U.S. PATENT DOCUMENTS

| | | | | |
|---|---|---|---|---|
| 6,021,202 A * | 2/2000 | Anderson | ............... | G06F 17/24 705/18 |
| 6,470,448 B1 * | 10/2002 | Kuroda | ............... | G06Q 20/389 705/75 |
| 7,155,409 B1 * | 12/2006 | Stroh | ............... | G06Q 10/087 705/35 |
| 8,301,529 B1 | 10/2012 | Anderson | | |
| 9,286,281 B2 * | 3/2016 | Dunn | ............... | G06F 17/243 |

(Continued)

FOREIGN PATENT DOCUMENTS

| EP | 1145479 | 10/2001 |
|---|---|---|
| WO | 00/67143 | 11/2000 |
| WO | 2013/045898 | 4/2013 |

OTHER PUBLICATIONS

Tygar, J.D., "Atomicity in Electronic Commerce", School of Computer Science, Carnegie Mellon University, (Jan. 1996), 22 pages.

(Continued)

*Primary Examiner* — Jay Huang
*Assistant Examiner* — Gabriel Mercado
(74) *Attorney, Agent, or Firm* — Nixon & Vanderhye P.C.

(57) ABSTRACT

An apparatus, system and method for establishing a transaction between first and second parties including a first signing step in which a transaction message including a request and a transaction identifier is cryptographically signed by the first party to form a first cryptographically signed message. The first signed message is transmitted from the first party to the second party. The second party then cryptographically signs the first message to form a second cryptographically signed message. The second message is also transmitted from one or more of a plurality of parties having the second message to a trusted third party. The trusted third party is able to verify that the second message was cryptographically signed by the second party and can also verify that the first message in the second message was cryptographically signed by the first party.

25 Claims, 6 Drawing Sheets

(56) References Cited

U.S. PATENT DOCUMENTS

| | | | |
|---|---|---|---|
| 2004/0059924 A1* | 3/2004 | Soto | G06F 21/32 713/186 |
| 2004/0068465 A1* | 4/2004 | Nagamine | G06Q 20/02 705/38 |
| 2004/0107348 A1* | 6/2004 | Iwamura | H04N 1/32128 713/176 |
| 2004/0249741 A1* | 12/2004 | Understein | G06Q 30/08 705/37 |
| 2008/0141033 A1* | 6/2008 | Ginter | G06Q 10/10 713/175 |
| 2008/0262969 A1* | 10/2008 | Samid | G06Q 20/04 705/64 |
| 2010/0262832 A1* | 10/2010 | Tie | H04L 9/321 713/176 |
| 2011/0161754 A1* | 6/2011 | Baptist | G06F 11/1092 714/718 |
| 2012/0123946 A1 | 5/2012 | Walker et al. | |
| 2012/0297360 A1* | 11/2012 | Lucco | G06F 8/30 717/108 |
| 2013/0080270 A1* | 3/2013 | Ronca | G06Q 20/3278 705/16 |
| 2014/0164765 A1* | 6/2014 | Hernandez Encinas | H04L 9/30 713/156 |

OTHER PUBLICATIONS

Launiainen, T., "A comparison of mobile authentication methods", Seminar of Internetworking, (Apr. 27, 2009), 5 pages.

International Search Report and Written Opinion of the International Searching Authority dated Oct. 27, 2014 in PCT/GB2014/052524, 11 pages.

* cited by examiner

RECONCILING ELECTRONIC TRANSACTIONS

BACKGROUND

The present invention relates to the field of electronic transactions between parties. For example, the present invention may have relevance to the field of monetary transactions.

Credit or debit card transactions are known mechanisms for performing monetary transactions between two parties, such as between a purchaser and a seller. After confirming the transaction amount, credit or debit transaction typically proceeds by the purchaser providing information that uniquely identifies them, such as an account or credit card number. The purchaser is then required to provide some means of authenticating that the transaction has been authorised by them. For example, the purchaser may be asked to enter a personal identification number (PIN). The PIN can be checked for validity by comparing it to a checksum value stored on the card itself, for example. Alternatively, when purchasing online or via telephone, where a PIN cannot be easily and securely entered, a user may be requested to provide additional information displayed on the credit or debit card to prove that the user has physical possession of the card. For example, the user may be requested to provide at least one of a CV2 code, a start date, an expiry date, or an issue number of a card. Again, this data is then checked for validity before the transaction is permitted to proceed. In either case, once the transaction is authenticated, the seller issues a transaction request to a trusted third party (also referred to as a clearing house or TTP), which performs the transaction and causes the funds to be transferred as appropriate.

Such a system has several drawbacks. In particular, it is necessary for the seller to have a connection to the clearing house in order to issue the transaction request.

A further disadvantage of this approach is that the authentication is entirely one-way. Although the seller is able to authenticate the purchaser, the buyer has no means of authenticating the seller. It would be possible for a nefarious fourth party to spoof or masquerade as the seller in order to deceive a user into agreeing to a transaction that was either valueless or one that the nefarious fourth party has no intention of following through on. In fact, such systems typically rely on the seller being implicitly trusted, and it is possible for this trust to be exploited. For example, having confirmed that the buyer agreed to a transaction of a particular value, the seller could secretly send a transaction request for a different value to the trusted third party.

Yet another disadvantage is the above approach does not provide any privacy. The purchaser is uniquely identified by the identification number that they provide. It is therefore possible for a seller, the trusted third party, or another entity elsewhere in the system to gather information on the buyer such as their spending habits or geographical location. By making inferences and cross referencing purchases, it is possible to also infer other information. For example, it could be inferred that a purchaser that buys a large amount of cat food every week owns several cats.

Some of these disadvantages can be overcome by the use of offline credit card transactions, which were common before the advent of dial-up modems. Offline credit card transactions involve creating a paper certificate authorising a specified payment from the card holder to the recipient. The paper certificate may be created by taking an impression of the credit or debit card on carbon paper, thereby creating an accurate copy of the card's details. The purchaser's signature is obtained, thereby validating the details and authorising the payment. Copies were kept by both parties so that neither could alter the contract subsequently without being detected, and at a later date, a trusted third party such as a card payment settling service would receive the details and initiate the transaction.

However, such a system remains problematic in several regards. Firstly, the issue of privacy is not overcome. In particular, the buyer is still identifiable, and purchase history, as well as other personal information, may be determined by other parties including the buyer.

Secondly, the identity of the seller is not verifiable by the buyer. In particular, the buyer has no means of verifying that a seller is who they claim to be.

A further disadvantage to both the above systems is that it is necessary for the buyer to have set up and provide full details regarding how payment is to be made, at the time of purchase. The seller must also have provided full details regarding how the payment is to be received prior to the time of purchase. This may be inconvenient if a user wishes to maintain a number of sources of funds and/or organise their finances at the time the purchase is made. The seller may wish to maintain a variety of accounts into which payments may be made, depending on a number of considerations. Such considerations may include, for example, liquidity of the seller's assets, the amount that the transaction is for, the nature of the goods, or the trustworthiness of the buyer.

Other known systems include the Octopus card, which is a smart card used for making electronic payments online or offline systems. Octopus allows users to pay for goods or services provided by businesses. Another known system is that of Bitcoins, which form part of a decentralised digital currency that can be spent online.

SUMMARY

According to a first aspect of the invention there is provided a machine-implemented method for establishing a transaction between a first party and a second party, the method comprising: a first signing step in which a transaction message comprising a request and a transaction identifier is cryptographically signed by said first party to form a first cryptographically signed message; a first transmitting step in which said first cryptographically signed message is transmitted from said first party to said second party; a second signing step in which said second party cryptographically signs said first cryptographically signed message to form a second cryptographically signed message; a third transmitting step in which said second cryptographically signed message is transmitted from one or more of a plurality of parties having said second cryptographically signed message to a trusted third party; a first verification step in which said trusted third party verifies that said second cryptographically signed message was cryptographically signed by said second party; a second verification step in which said trusted third party verifies that said first cryptographically signed message in said second cryptographically signed message was cryptographically signed by said first party; and a transaction execution step in which, in response to positive verifications from said first verification step and said second verification step, said trusted third party manages execution of said request specified by said second cryptographically signed message.

In accordance with the above aspect, it is possible to provide a method of establishing a transaction between a first party and a second party, such as between a buyer and a seller, in which the transaction has been authorised by both the first party and the second party by means of a digital signature, thereby forming a message that has been cryptographically signed by both parties (the second cryptographically signed message). With the transaction having been digitally signed by both parties, it is not possible for any party, including the buyer or seller, to alter the transaction without it being detectable that the transaction has been altered. Accordingly, it can be ascertained with a high degree of certainty that both parties agreed to the transaction and that the transaction has not been modified following such agreement. Once the transaction has been transferred to the trusted third party, it can be verified that the signatures used by the first and second parties to sign the transaction are valid. If the signatures are valid, the trusted third party can manage (directly or indirectly) execution of the transaction. Hence, there is a logical disconnect between the process of agreeing to the transaction and executing the transaction. It is therefore possible for either of the two parties to provide more specific details on exactly how the transaction is to be carried out, after the transaction has been agreed. For example, the buyer could specify which bank account is to be used to debit the transaction amount from or what address goods are to be delivered to, after the transaction agreement has been made. The process of agreeing the transaction establishes a contract, but it is not required that the contract is executed immediately. For example, physical goods may be provided on the strength of an enforceable contract that monies will be transferred to the provider in return. Similarly, the seller might decide what bank account should be used to credit the funds to, after the transaction has been agreed.

In some embodiments, a plurality of routes is available for sending the cryptographically signed message to the trusted third party. Since the transaction cannot be altered without detection, there is also no requirement that a specific party forwards the transaction to a trusted third party in order for that transaction to be executed. Hence, a plurality of routes is available for sending the transaction, which has been signed by both parties, to the trusted third party. For example, the transaction can be forwarded directly from either the buyer or the seller, and could be forwarded to the trusted third party indirectly through an intermediate party. The trusted third party may even receive multiple copies of the original digitally signed transaction. Hence, there is an increased flexibility in how the transaction is executed. However, in some embodiments, the step of transmitting the second cryptographically signed message is performed by at least one of the first party and second party.

In some embodiments the step of executing the transaction takes place in dependence on a predetermined condition being met. In this way, it is possible to enforce a delay between the transaction being received at the trusted third party and the transaction being executed by the trusted third party. For example, the predetermined condition may be that both the first party and second party have provided sufficient financial details for the transaction to take place. In particular, it may be necessary for a buying party to provide information specifying a source of funds and the selling party to provide information specifying a destination of funds. That is, at least one of parties may provide additional information that further specifies the transaction.

In some embodiments, the execution of transaction is performed as an atomic operation. In some of those embodiments, the atomic operation is performed using a two-phase commit protocol. These techniques can be used to further improve security when executing the transaction.

In some embodiments the transaction is a transfer of a monetary amount between said first party and said second party. The monetary amount may be a positive amount indicating that that amount of money is to be deducted from the first party and credited to the second party. Alternatively, the monetary amount may be a negative amount in which case the monetary amount is credited to the first party and deducted from the second party.

The transaction message may comprise a payload. The payload may comprise encrypted data whilst a decryption means for decrypting the encrypted data (e.g. a decryption key) may be held by the trusted third party. In some of these embodiments, once the first verification step and the second verification step provide positive verifications, the trusted third party transmits the decrypting means to the second party. Accordingly, once the transaction has been verified by the trusted third party as being valid, the trusted third party sends the decrypting means to the second party thereby enabling the second party to decrypt the encrypted data in the payload. Such embodiments make it possible to effect the transaction of digital goods. For example, the encrypted data may represent encrypted media data such as an MP3 or video file, which can only be decrypted once a transaction for a monetary amount has been concluded. In other embodiments, the encrypted data may represent a digital key that grants rights to use a particular good or service.

In some embodiments the transaction identifier is generated by using a random or pseudo-random number generator. It will be appreciated by the skilled person that a pseudo-random number generator involves the generation of numbers that appear to be random but are not. That is, the output of a pseudo-random number generator may be one that contains no recognisable patterns or regularities.

The first cryptographically signed message may comprise a unique (or pseudo-unique) identifier for said first party. The identifier enables the trusted third party to select the appropriate cryptographic key, e.g. the first party's public key, with which to validate the first signature. In order to maintain the anonymity of the first party with respect to the second party, the first party may choose to establish multiple identifiers with the trusted third party, using a fresh one for each transaction. These identifiers may be formed from a pseudo-randomly generated sequence of numbers, or may be otherwise agreed in advance of, or even subsequent to, the transaction.

The second cryptographically signed message may comprise a unique (or pseudo-unique) identifier for the second party. This identifier enables the trusted third party to select the appropriate cryptographic key, typically the second party's public key, with which to validate the second signature. In order to maintain the anonymity of the second party with respect to the first party, the second party may choose to establish multiple identifiers with the trusted third party, using a fresh one for each transaction. These identifiers may be formed from a pseudo-randomly generated sequence of numbers, or may be otherwise agreed in advance of, or even subsequent to, the transaction.

In some embodiments the method further comprises a witnessing step in which a witness receives said cryptographically signed message and cryptographically signs said second cryptographically signed message to form a third cryptographically signed message; and a witness verification step in which said trusted third party verifies that said third cryptographically signed message was cryptographically signed by said witness, wherein said second cryptographically signed message is transmitted to said trusted third party as part of said third cryptographically signed message.

Accordingly, it is possible for a witnessing party to witness the transaction between the first party and the second party. This makes it possible to further verify the authenticity of a transaction between two parties, since that transaction has been observed by yet another party. The witnessing party cryptographically signs the second cryptographically signed message to form a third cryptographically signed message, thereby making it difficult for any party to alter the underlying transaction without detection. It is not necessary for the witnessing party to have details of the transaction itself. Hence, the second cryptographically signed message could be encrypted prior to being witnessed by the witnessing party. It is also unnecessary for the witnessing party to be able to verify the authenticity of any part of the second cryptographically signed message. Instead, the witness may merely authenticate that two parties engaged in a transaction. In some of these embodiments, the witness is one of said plurality of parties able to transmit the transaction to the trusted third party and actually transmits the resulting third cryptographically signed message to the trusted third party.

In embodiments, the method may be initiated by either party, whether buyer or seller. It is symmetric and thus either party may make the initial request. It is expected that the buyer will typically initiate the procedure, especially when conducted in the real world as opposed to the online one, because the seller or second party is more likely to have fixed connectivity infrastructure over which to forward the second message to the trusted third party.

In some embodiments, the first and second signing steps use private keys and the first and second verification steps use corresponding public keys. It will be appreciated that in embodiments that where additional parties cryptographically sign messages, those other parties (e.g. witnesses) may also perform cryptographic signing using a private key and any subsequent verification step may be performed using a corresponding public key.

According to a second aspect of the present invention, there is provided a system for establishing a transaction comprising: a first party comprising: first signing circuitry configured to cryptographically sign a transaction message comprising a request and a transaction identifier to form a first cryptographically signed message; and first transmitting circuitry configured to transmit said first cryptographically signed message to a second party; said second party comprising: second signing circuitry configured to cryptographically sign said first cryptographically signed message to form a second cryptographically signed message; second transmitting circuitry configured to transmit said second cryptographically signed message to said first party; and a trusted third party comprising: receiving circuitry configured to receive said second cryptographically signed message transmitted from one or more of a plurality of parties having said second cryptographically signed message to said trusted third party; first verification circuitry configured to verify that said second cryptographically signed message was cryptographically signed by said second party; second verification circuitry configured to verify that said first cryptographically signed message in said second cryptographically signed message was cryptographically signed by said first party; and transaction executing circuitry configured to execute said request specified by said second cryptographically signed message in response to positive verifications from said first verification circuitry and second verification circuitry.

According to a third aspect of the present invention, there is provided an apparatus for establishing a transaction with a second party comprising: signing circuitry configured to cryptographically sign a transaction message comprising a request and a transaction identifier to form a first cryptographically signed message; and first transmitting circuitry configured to transmit said first cryptographically signed message to said second party; receiving circuitry configured to receive a second cryptographically signed message, said second cryptographically signed message comprising said first cryptographically signed message, wherein said signed message is cryptographically signed by said second party; and second transmitting circuitry configured to transmit said second cryptographically signed message to a trusted third party.

This aspect corresponds to the apparatus making up the first party in the second aspect. The signing circuitry described above corresponds with the first signing circuitry in the second aspect. The receiving circuitry corresponds with the first receiving circuitry in the second aspect. The second transmitting circuitry corresponds with the third transmitting circuitry of the second aspect.

According to a fourth aspect of the present invention, there is provided an apparatus for establishing a transaction with a first party comprising: receiving circuitry configured to receive a first cryptographically signed message, said first cryptographically signed message comprising a request and a transaction identifier, wherein said first cryptographically signed message is cryptographically signed by said first party; signing circuitry configured to cryptographically sign said first cryptographically signed message to form a second cryptographically signed message; first transmitting circuitry configured to transmit said second cryptographically signed message to said first party; and second transmitting circuitry configured to transmit said second cryptographically signed message to a trusted third party.

This aspect corresponds to the apparatus making up the second party in the second aspect. The receiving circuitry described above corresponds with the second receiving circuitry in the second aspect. The signing circuitry corresponds with the second signing circuitry in the second aspect. The first transmitting circuitry corresponds with the second transmitting circuitry of the second aspect. The second transmitting circuitry corresponds with the third transmitting circuitry of the second aspect.

According to a fifth aspect of the present invention, there is provided an apparatus for verifying validity of a transaction between a first party and a second party comprising: receiving circuitry configured to receive a second cryptographically signed message comprising a first cryptographically signed message comprising a request and a transaction identifier; first verification circuitry configured to verify that said second cryptographically signed message is cryptographically signed by said second party; and second verification circuitry configured to verify that said first cryptographically signed message in said second cryptographically signed message is cryptographically signed by said first party; transaction executing circuitry configured to execute said request specified by said second cryptographically signed message in response to positive verifications from said first verification circuitry and second verification circuitry.

This aspect corresponds to the apparatus making up the trusted third party in the second aspect. The receiving circuitry described above corresponds with the third receiving circuitry in the second aspect.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
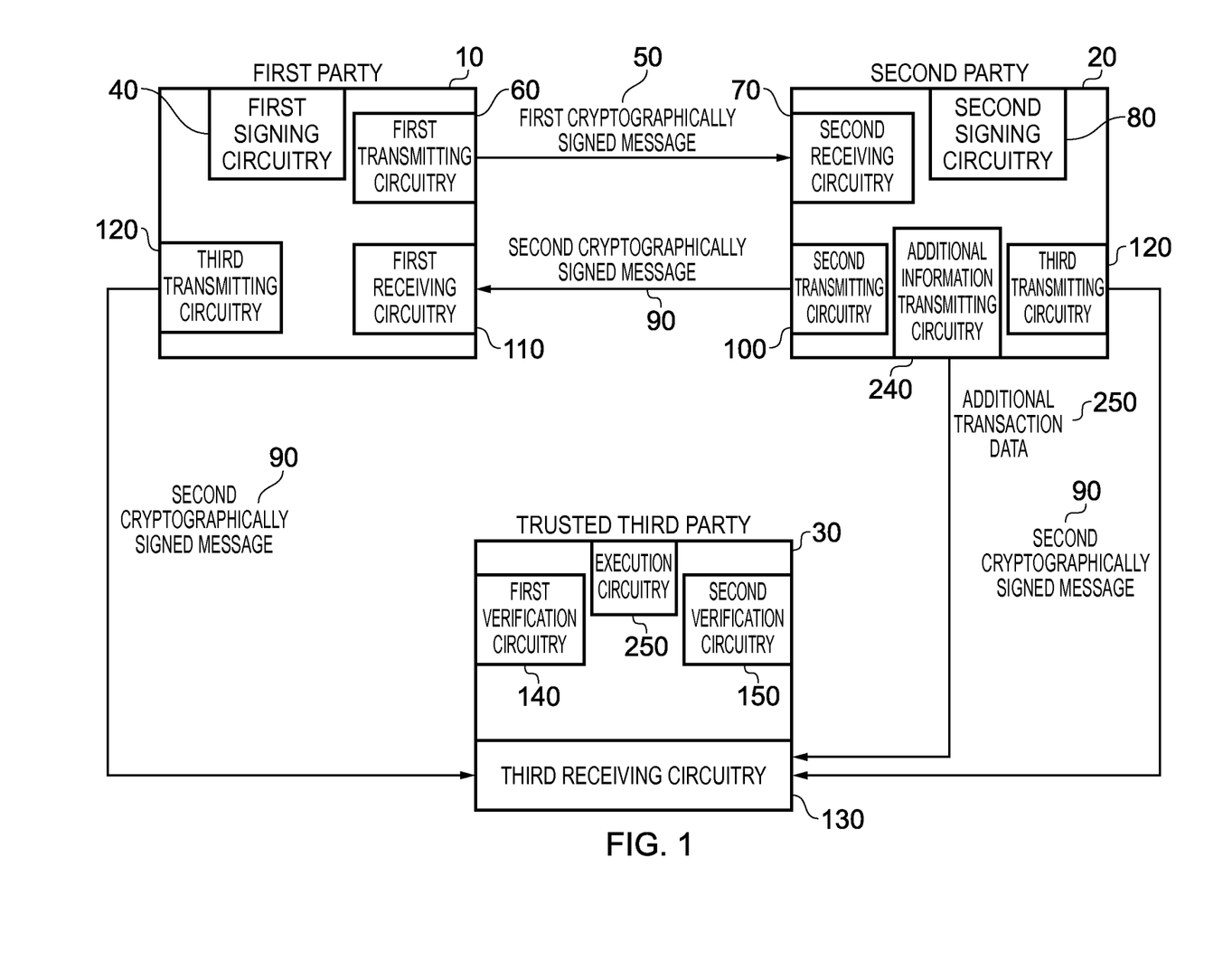
FIG. 1 is a block diagram of a system for establishing a transaction in accordance with one embodiment.

FIG. 1 is a block diagram of a system for establishing a transaction between a first party 10 and a second party 20. The transaction is sent to a trusted third party 30. The first party 10 comprises a first signing circuitry 40 for cryptographically signing a transaction message comprising a request and a transaction identifier to form a first cryptographically signed message 50. Typically, the generation of the transaction message will be carried out by the first party 10. However, in other embodiments, this transaction message may be generated by another party. The contents of the first cryptographically signed message 50 are shown in more detail with reference to FIG. 2. The first party 10 and the second party 20 may be located together, e.g. face-to-face with short range wireless communication, and the trusted third party 30 may be remote, e.g. a web-based transaction clearing service.

Processes of cryptographic signing will be known to the skilled person. In general, the process of cryptographically signing a message involves generating a digest or hash of the message using a one-way hashing algorithm. An example of such an algorithm is MD5. A key feature of such a hashing algorithm is that it is computationally intractable to find a different input that produces the same output. Consequently, any change to the original message should result in a different digest being produced. Having calculated the digest, the digest is encrypted using one half of an asymmetric cryptographic key held by that party. For example, this may be achieved by using the private key of a public/private key pair. It will be appreciated that the strength of the cryptographic signature is dependent on the first half of the asymmetric cryptographic key (e.g. the private key) being kept secret from everyone except the party holding that key. Where multiple parties sign messages, each party will therefore use a different asymmetric cryptographic key pair. Furthermore, although each party will typically use the same one-way hash function, there is no requirement that this is the case, provided that it is known which hash function is used in each case.

Within this specification, the above process is described as cryptographically signing a message, and the original message and signed digest are said to form a cryptographically signed message. Other forms of cryptographic signing are also possible and are encompassed within the present techniques.

The first party 10 comprises first transmitting circuitry 60 for transmitting the first cryptographically signed message 50 to second receiving circuitry 70 held by the second party 20.

On receiving the first cryptographically signed message 50, approval or rejection of the transaction is sought from the second party 20. If the transaction is rejected, second party 20 may respond by providing a counteroffer to first party 10. Alternatively, in other embodiments, second party 20 may respond by taking no further action. If the transaction is approved, second party 20 will form a second transaction message comprising the first cryptographically signed message 50. The second transaction message is then cryptographically signed using second signing circuitry 80 to produce a second cryptographically signed message 90.

In this embodiment, having generated the second cryptographically signed message 90, second transmitting circuitry 100 and third transmitting circuitry 120 each transmit the second cryptographically signed message 90 to the first party 10 and the trusted third party 30 respectively.

First party 10 receives the second cryptographically signed message 90 via first receiving circuitry 110. The trusted third party 30 receives the second cryptographically signed message 90 via a third receiving circuitry 130. Although this embodiment shows a separate second transmitting circuitry 100 and third transmitting circuitry 120, it will be appreciated by the skilled person that a single transmitting circuitry could be used to transmit the second cryptographically signed message 90 to a plurality of different targets including the first party 10 and trusted third party 30.

In this embodiment, the second cryptographically signed message 90 is transmitted to the first party 10 in order to provide an added layer of security and reassurance to the first party 10. This transmission also enables auditing to be carried out by providing a record of the second cryptographically signed message 90 to all relevant parties. In some embodiments however, this step may be forgone and the second cryptographically signed message 90 may not be sent back to the first party 10. Because the first and second parties have no means of validating each others' signatures themselves, there is no requirement for the first party to receive a copy of the signed second message. The transaction can only be validated by the trusted third party, which notifies or at least makes available the result to the first and second parties, who may proceed accordingly at that time.

In this embodiment both first party 10 and second party 20 comprise third transmitting circuitry 120 for transmitting the second cryptographically signed message 90 to the trusted third party 30. However, it will be appreciated by the skilled person that the third transmitting circuitry 120 may be included in only one of the first party 10 or second party 20. Furthermore, in other embodiments, neither the first party nor the second party will directly transmit the second cryptographically signed message 90 to the trusted third party 30 via third transmitting circuitry 120, but instead transmit the second cryptographically signed message 90 to a fourth party (not shown), which will transmit the second cryptographically signed message 90 to the trusted third party 30. In this way, neither the first party 10 nor the second party 20 need be connected to the trusted party 30 to establish a transaction between the two parties. Instead, a transaction can be established between the two parties and sent to the trusted party 30 at a later time (i.e. "offline" transactions may be supported).

Since, in this embodiment, neither party is able to immediately validate the signature of their counterparty, the transaction must remain on hold until such time as the trusted third party has validated them. Transactions commonly involve an exchange, that is two transfers in opposite directions. For example goods may be provided in exchange for money. To facilitate physical-world transactions in offline situations, some embodiments may precede or accompany the first and second transaction messages with an exchange of cryptographic certificates, issued by the trusted third party acting as a certificate authority, or by subsidiary certificate authorities. These certificates contain a public key of the sending party and an acknowledgement by the certificate authority that said public key belongs to said sending party. The whole is signed by the certificate authority itself using its well-known public key. By exchanging these certificates alongside or before the transaction, the second and first parties may verify using verification circuitry the integrity and signatures of the first and second messages which may thus provide adequate grounds to execute the transaction immediately, knowing that the reciprocal half will be honoured and executed in due course.

In other embodiments, the first party 10 comprises first validation circuitry. The first validation circuitry validates the second cryptographically signed message 90. That is, it verifies that the second cryptographically signed message 90 was cryptographically signed by the second party 20. This may occur by using a certificate issued to the first party 10 by the trusted third party 30 or an agent thereof. In some embodiments, the second party 20 comprises second validation circuitry, which validates that the first cryptographically signed message 50 was cryptographically signed by the first party 10.

In this embodiment, the trusted third party 30 receives the second cryptographically signed message 90 via third receiving circuitry 130.

Having received the second cryptographically signed message 90, the trusted third party 30 uses first verification circuitry 140 to verify that the second cryptographically signed message 90 was cryptographically signed by the second party. The skilled person will appreciate that there a number of ways in which this verification can be performed. However, in one embodiment the verification is performed by using the second half of the asymmetric cryptographic key that was used to encrypt the digest that was previously discussed. For example, if the second party used its private key to sign the digest, then the trusted third party 30 can use the corresponding public key. This process ensures that the digest contained within was produced by the second party, since only the second party has access to the private key. The decrypted digest should then represent a one-way hash of the second transaction message. This can be confirmed by using the same one-way hash function on the second transaction message as that used by the second party. If the two digests match each other, then it can be assumed, with a reasonable degree of certainty, that the second transaction message has not been altered. If the two digests are different, then the second transaction message may have been altered during transit. The principle of this process is that a nefarious fourth party may be able to alter the second transaction message. However, not having access to the second party's private key, it is not possible for that fourth party encrypt a digest of that message that appears to come from the second party 20. Hence, if the digests do not match, or if the digest cannot be decrypted using the relevant key, then there is a reasonable chance that the transaction has been altered.

In a similar manner, the second verification circuitry 140 held at the trusted third party 30 is able to verify that the first cryptographically signed message 50 has not been altered during transit. This can be achieved by the trusted third party using the second half of the asymmetric key used by the first party 10 to sign cryptographically signed message 50. For example, the second verification circuitry 140 may use a public key of the first party 10 that corresponds with a private key used by the first signing circuitry 40 at the first party 10 to access the digest that corresponds with the transaction message. By applying the same one-way hash function to the transaction message and comparing the result to the digest extracted from the first cryptographically signed message, it is possible to verify whether or not the transaction message was altered after having been signed.

In this embodiment, the parties provide a unique or pseudo-unique identifier in the transaction messages. In order to preserve anonymity, these identifiers may be chosen from a selection available to each party, and may even be single-use. In other embodiments, neither the first party 10 nor the second party 20 provide any identification. In such embodiments, the trusted third party 30 may be unable to determine which key to use in order to verify the signatures used in the cryptographically signed messages. The trusted third party must therefore try each key that it has access to, in order to determine which parties signed the cryptographically signed messages. For large numbers of parties, this process may be impractical.

The second party 20 may also comprise additional information transmitting circuitry 240. This circuitry may be used to transmit additional transaction data 250, which is received by the third receiving circuitry 130 at the trusted third party, separate from the transaction message. For example, the additional transaction data 250 may include a bank account to which the proceeds from the transaction are to be sent. Accordingly, after the transaction has been agreed to, further details regarding the transaction may be provided by the second party 20 at a later time. In this embodiment, only the second party 20 is shown to have additional information transmitting circuitry 240. However, in other embodiments, the first party 10 may have this circuitry instead or as well as the second party 20. In other embodiments, neither party may have additional information transmitting circuitry 240.

If the first verification circuitry 140 and second verification circuitry 150 at the trusted third party 30 return positive results, and once the trusted third party 30 has all the information necessary to execute the transaction (which may include additional transaction data 250), then the transaction may be executed by execution circuitry 250 at the trusted third party 30. This may involve crediting the bank account of first party 10 and debiting the account of the second party 20. This process may be carried out using an atomic operation and may also use a two-phase commit protocol.

Consequently, in accordance with the above embodiment, a transaction is generated by the first party 10 and signed, such that the transaction message cannot be altered by any other party without detection. The second party 20 receives this first cryptographically signed message 50 and, if the transaction is acceptable, the first cryptographically signed message 50 then forms part of a second transaction message, which is subsequently signed by the second party 20 to form a second cryptographically signed message 90. In this way, the underlying transaction that the first party 10 and the second party 20 have agreed to cannot be altered by anyone without the agreement of both the first party 10 and second party 20. This second cryptographically signed message 90 is then sent back to the first party 10. Either party can then transmit the second cryptographically signed message 90 to the trusted third party 30. This is possible because neither party can alter the underlying transaction without the agreement of the other party. Accordingly, the transaction is secure. The trusted third party 30 uses first verification circuitry 130 and second verification circuitry 140 to confirm that the signatures are valid, i.e. that the underlying transaction has not been altered whilst in transit. Accordingly, the trusted third party 30 is able to verify that both parties have agreed to the transaction.

In some embodiments, the first party and/or the second party comprise user-presence detecting circuitry for verifying the physical presence of an authorised user before continuing the transaction. For example, a cryptographic message may not be signed by a device unless an authorised user of that device is detected to be physically present.

Figure 2:
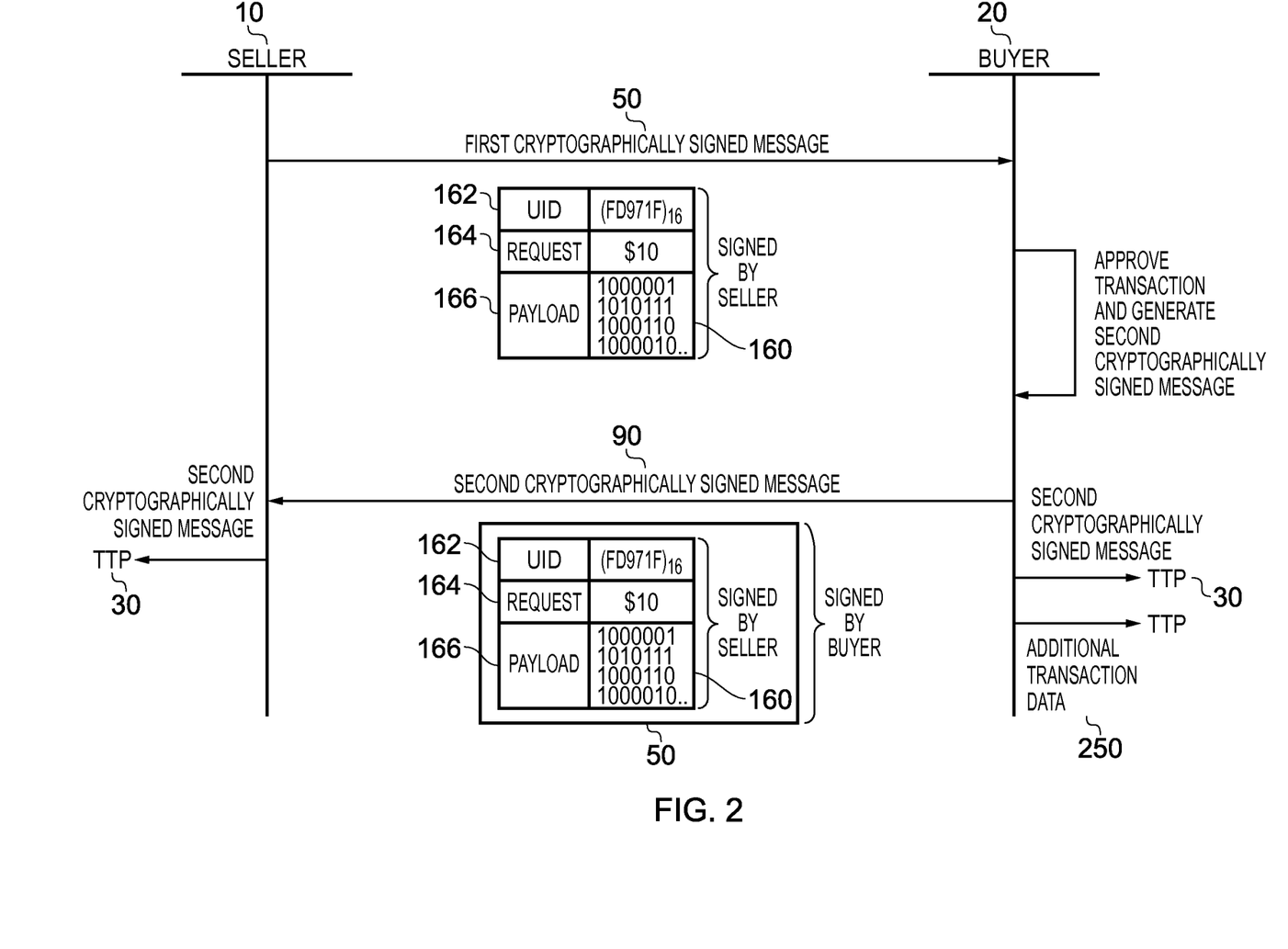
FIG. 2 schematically illustrates the process of exchanging cryptographically signed messages between a first party (seller) and second party (buyer) in accordance with one embodiment.

FIG. 2 schematically shows the sequence of message exchanges that occur between a first party (seller) 10 and a second party (buyer) 20.

As can be seen, the transaction message 160 comprises a unique identifier (UID) 162, which is a unique transaction identifier for this particular transaction. In this example, the UID is FD971F, which is a hexadecimal value. The UID can be used to uniquely identify a particular transaction between two parties.

The transaction message 160 also comprises a request 164. In this embodiment, the request is for the monetary amount of $10.

In this embodiment, transaction message 160 also comprises a payload 166. In this example, the payload is a binary code that may represent, for example, a media file that has been encrypted. In this example, the transaction message may represent, for example, the offer to purchase a piece of music for $10, the piece of music being enclosed in an encrypted form as the payload 166. The first cryptographically signed message 160 is formed by the first party 10 cryptographically signing the transaction message 160 in the manner previously described. The first cryptographically signed message 50 is transmitted to and received by the buyer 20. If the transaction is approved, then the buyer 20 then generates a second transaction message comprising the first cryptographically signed message. The second transaction message is then cryptographically signed to form a second cryptographically signed message 90. This message is then sent back to the seller 10 and also to the trusted third party 30. The buyer 20 also transmits any additional transaction data 250 to the trusted third party 30.

In this way, it is not possible for any party to alter the UID 162, request 164, or payload 166 without the permission of both the seller 10 and the buyer 20. Since the first cryptographically signed message 50 has been signed using a private key of the seller 10 and since the second cryptographically signed message has been signed using the private key of the buyer 20, and since those private keys are only held by the seller 10 and buyer 20 respectively, it is possible to verify that the original transaction message has been unaltered since its first proposal and was agreed to by both the seller 10 and buyer 20.

Figure 3:
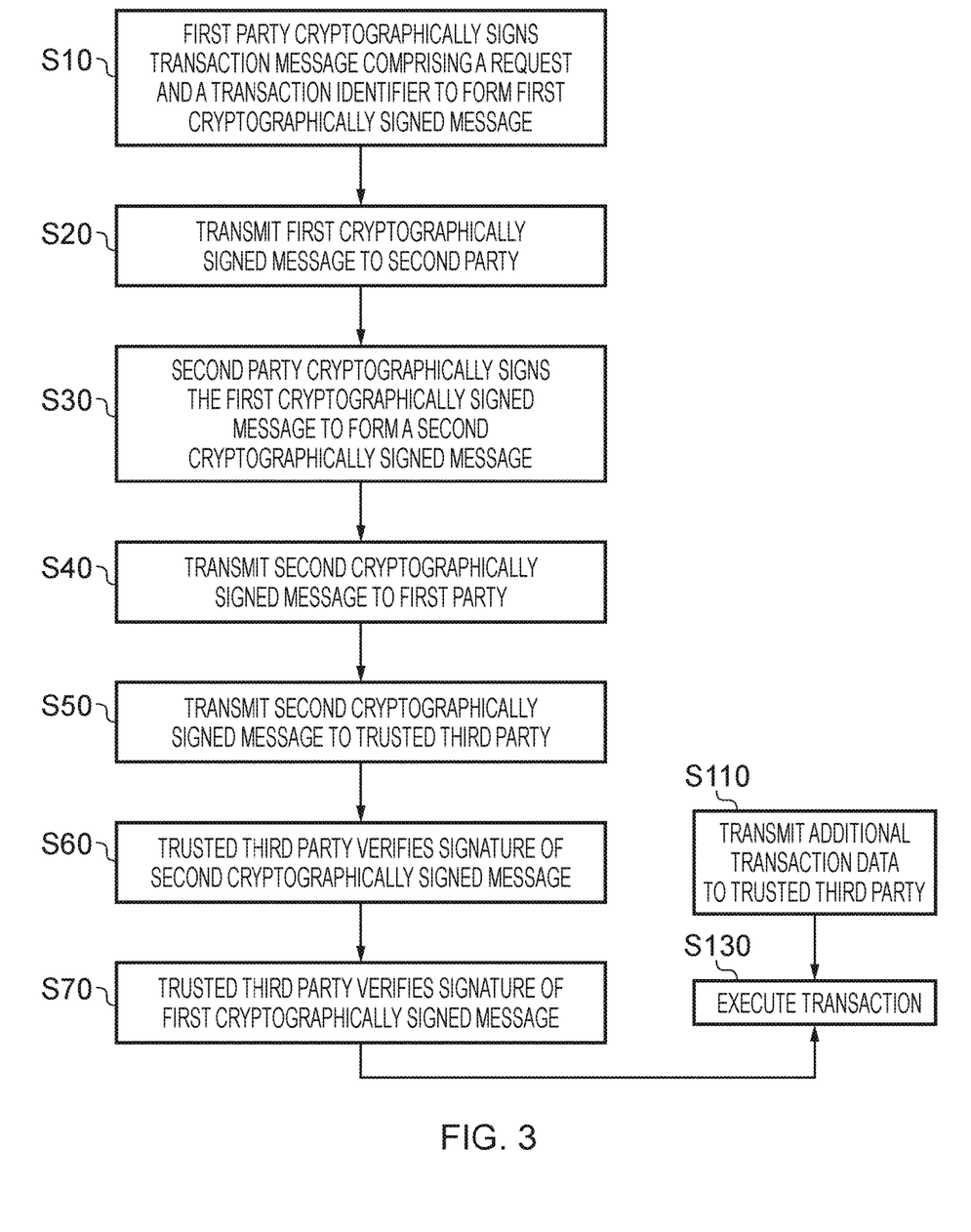
FIG. 3 is a flow diagram illustrating the steps performed by the system of FIG. 1 in accordance with one embodiment.

FIG. 3 is a flow diagram illustrating the steps performed by the system shown in FIG. 1.

In step S10, the first party 10 cryptographically signs a transaction message 160 comprising at least a request 164 and a transaction identifier 162 to form a first cryptographically signed message 50.

In step S20, the first cryptographically signed message 50 is transmitted to the second party 20.

In step S30, the second party 20 forms a second transaction message comprising the first cryptographically signed message 50, and cryptographically signs the second transaction message to form a second cryptographically signed message 90.

In step S40, the second cryptographically signed message 90 is transmitted back to the first party 10.

In step S50 the second cryptographically signed message 90 is transmitted to the trusted third party 30. This step may be carried out by the first party 10, the second party 20 or another party to which the second cryptographically signed message 90 has been sent.

Step S60, the trusted third party 30 verifies the signature of the second cryptographically signed message 90, thereby determining that the second cryptographically signed message was signed by the second party 20.

In step S70, the trusted third party 30 verifies the signature of the first cryptographically signed message 50, thereby verifying that the original transaction message was signed by the first party 10.

In step S110, any additional transaction data 250 is transmitted to the trusted third party 30. This step is optional, since there may not be any additional transaction data 250 to be received.

In step S130, if the signatures are valid, and if sufficient data is available, then the transaction can be executed. Otherwise, the transaction may have been altered during transit and must either be abandoned or investigated as appropriate.

Figure 4:
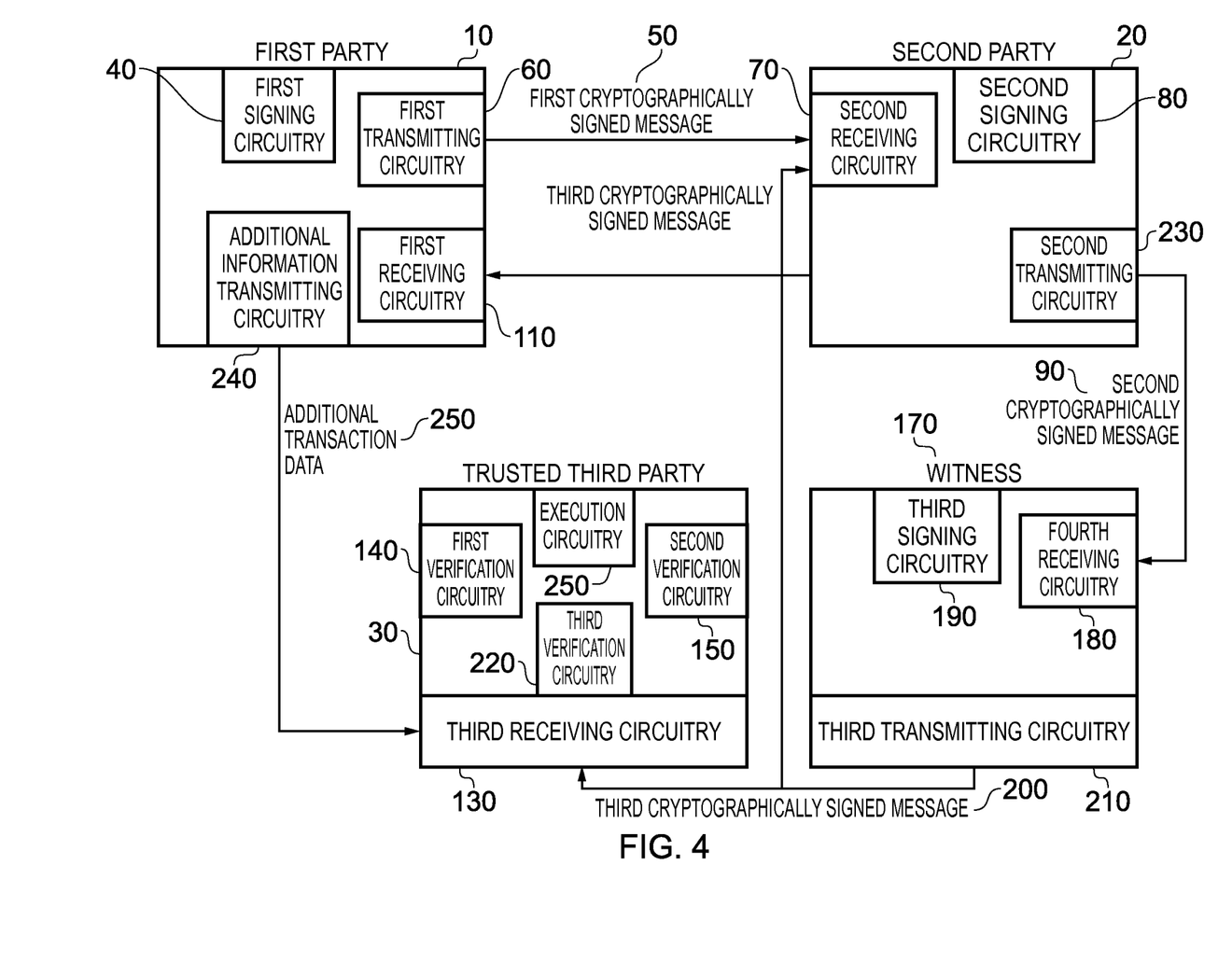
FIG. 4 is a block diagram of a system for establishing a transaction in accordance with a second embodiment.

FIG. 4 shows a second embodiment, in which a witness 170 is used to witness that a transaction has occurred between a first party 10 and a second party 20. The system shown in the second embodiment functions in the same manner as the first embodiment, except as where indicated below.

In the second embodiment, when the second cryptographically signed message has been generated, it is transmitted by second transmitting circuitry 230 to the witness 170. The second cryptographically signed message 90 is received at the witness 170 by the fourth receiving circuitry 180.

In this embodiment, the witness 170 does not verify whether or not the incoming message has been altered during transit. Instead, in this embodiment, such detection is carried out by the trusted third party 30 as previously discussed in relation to the system shown in FIG. 1. However, in other embodiments, the witness may carry it out such a validity checks itself. Accordingly, if such checks fail, then the witness 170 may refuse to proceed further. The witness may, for example, be physically present with both buyer and seller when the transaction is agreed.

In the embodiment shown in FIG. 4, the witness produces a third transaction message comprising the second cryptographically signed message 90. The third transaction message is cryptographically signed to produce a third cryptographically signed message 200. The process of signing the second cryptographically signed message 90 to form a third cryptographically signed message 100 ensures that the original transaction message cannot be modified without the consent of the first party 10, the second party 20, and also witness 170. Furthermore, the process of signing ensures that the original transaction was agreed to by the first party 10 and the second party 20 and that it was witnessed by the witness 170. Accordingly, the witness 170 adds a further level of security to the transaction process.

The third cryptographically signed message 200 is transmitted by third transmitting circuitry 210 in the witness 170, which is received by the first processing circuitry 130 at the trusted third party, first receiving circuitry 110 at the first party 10, and the second receiving circuitry 70 at the second party 20. Hence, the third transmitting circuitry in this embodiment performs a similar function to the second and third transmitting circuitries in the embodiment shown in FIG. 1.

It will be appreciated by the skilled person that there are other arrangements possible. In particular, the witness 170 may use different transmitting circuitry to transmit the third cryptographically signed message to each of the first party 10, second party 20, and trusted third party 30. Furthermore, the witness 170 may not transmit the third cryptographically signed message 200 to the first party 10 or the second party 20. Still furthermore, the witness 170 may not transmit the third cryptographically signed message 200 directly to any party but may instead transmit the third cryptographically signed message 200 to yet another party that forwards the third cryptographically signed message 200 either to the first party 10, second party 20, and trusted third party 30, or some combination thereof.

Once the third cryptographically signed message 200 is received by the third receiving circuitry 130 at the trusted third party 30, the third cryptographically signed message 200 is verified by the third verification circuitry 220. The third verification circuitry 220 verifies that the signature of the third cryptographically signed message 200 is valid. This verification process may proceed in a manner similar to that of the first verification circuitry 140 and second verification circuitry 150.

The first verification circuitry 140 and second verification circuitry 150 held at the trusted third party 30 work as described in relation to the embodiment shown in FIG. 1.

If positive results are received from the first, second, and third verification circuitry, and if sufficient information is available (which may include any additional transaction data 250), the trusted third party 30 may execute the transaction using execution circuitry 250.

Additionally, in this embodiment, the additional information transmitting circuitry 240 is part of the first party 10. In all other respects, it works in the same way as that described in FIG. 1.

Figure 5:
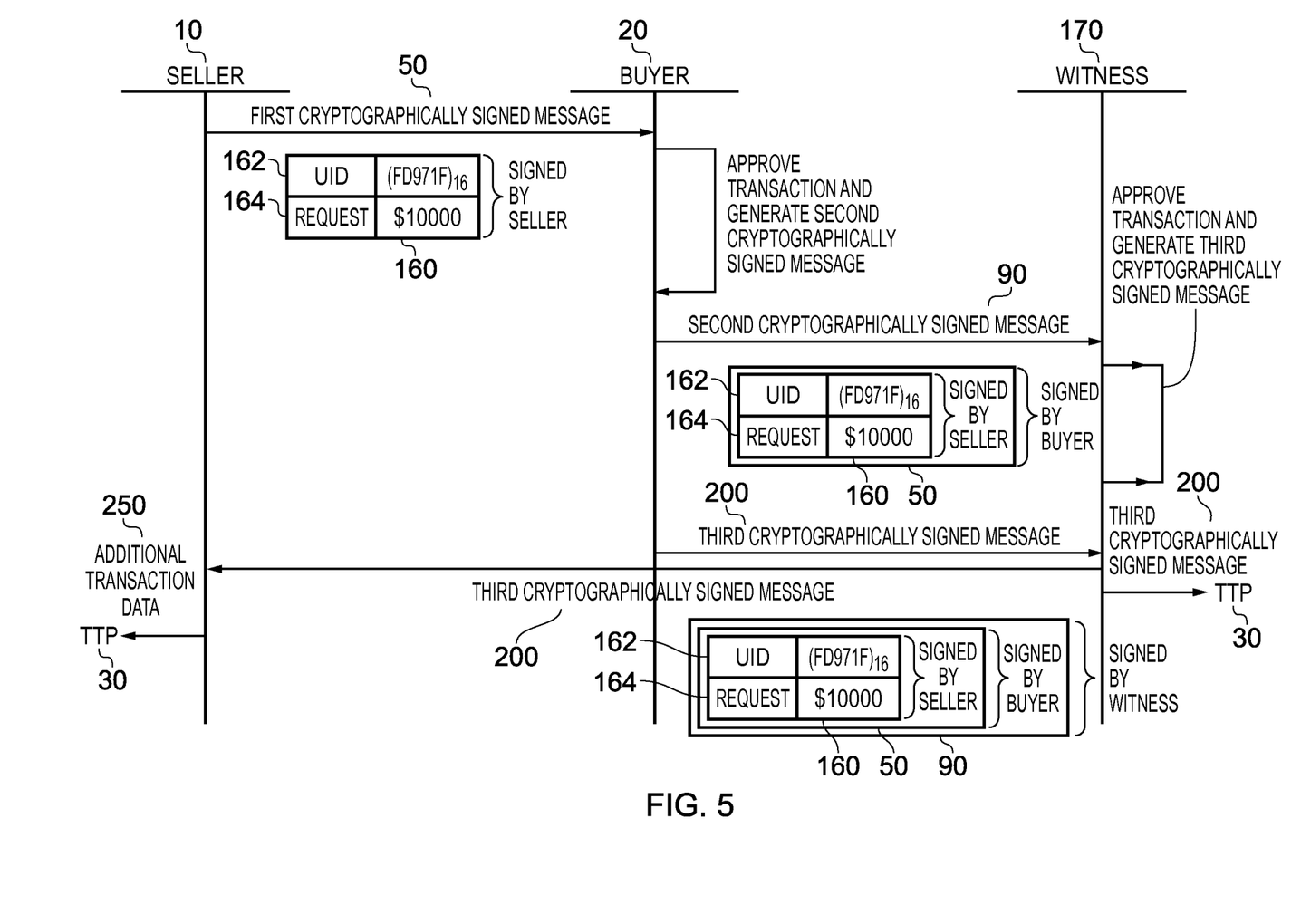
FIG. 5 schematically illustrates the process of exchanging cryptographically signed messages between a first party (seller) and second party (buyer) and a witness in accordance with the second embodiment.

FIG. 5 schematically illustrates the sequence of message exchanges that occur in the system of FIG. 4 when establishing a transaction between a first party (seller 10) and a second party (buyer) 20, which is witnessed by a witness 170. In this sequence of transactions, the seller 10 generates a transaction message 160 comprising a UID 162 and a request 164. In this example, the UID has a value of FD971F, which a hexadecimal value. The transaction message also has a request 164 value of $10,000. The transaction message 160 is cryptographically signed by the seller 10 in order to produce a first cryptographically signed message 50, which is transmitted to the buyer 20.

On receiving the first cryptographically signed message 50, the buyer 20 determines whether the transaction is approved or not. If the transaction is not approved, the process stops. In other embodiments, if the transaction is not approved the buyer 20 may respond with a counter offer by generating a new transaction message having a different UID and request, cryptographically signing this new transaction message, and sending the new transaction message back to the seller 10. In this embodiment, if the transaction is approved, then a second transaction message is formed, comprising the first cryptographically signed message. This second transaction message is then cryptographically signed to form a second cryptographically signed message 90. The second cryptographically signed message 90 is then transmitted to the witness 170.

In this embodiment the witness 170 simply forms a third transaction message comprising the second cryptographically signed message 90 and then cryptographically signs the third transaction message to form a third cryptographically signed message 200. Accordingly, in this embodiment it is not necessary for the witness to have the details of the transaction and the witness 70 may simply verifies that a transaction occurred between the seller 10 and the buyer 20. In other embodiments, as previously discussed, the witness 170 may itself verify that the second cryptographically signed message 90 is validly signed by the buyer 20 and that the first cryptographically signed message 50 is validly signed by the seller 10 before generating the third cryptographically signed message 200.

Once the third cryptographically signed message 200 has been generated, it is transmitted to the buyer 20, the seller 10, and the trusted third party 30.

Additional transaction data 250 is also transmitted from the seller 10 to the trusted third party 30 at an undefined time after the third cryptographically signed message 200 is sent to the trusted third party 30. The trusted third party 30 may delay any execution of the transaction until this data is received.

Figure 6:
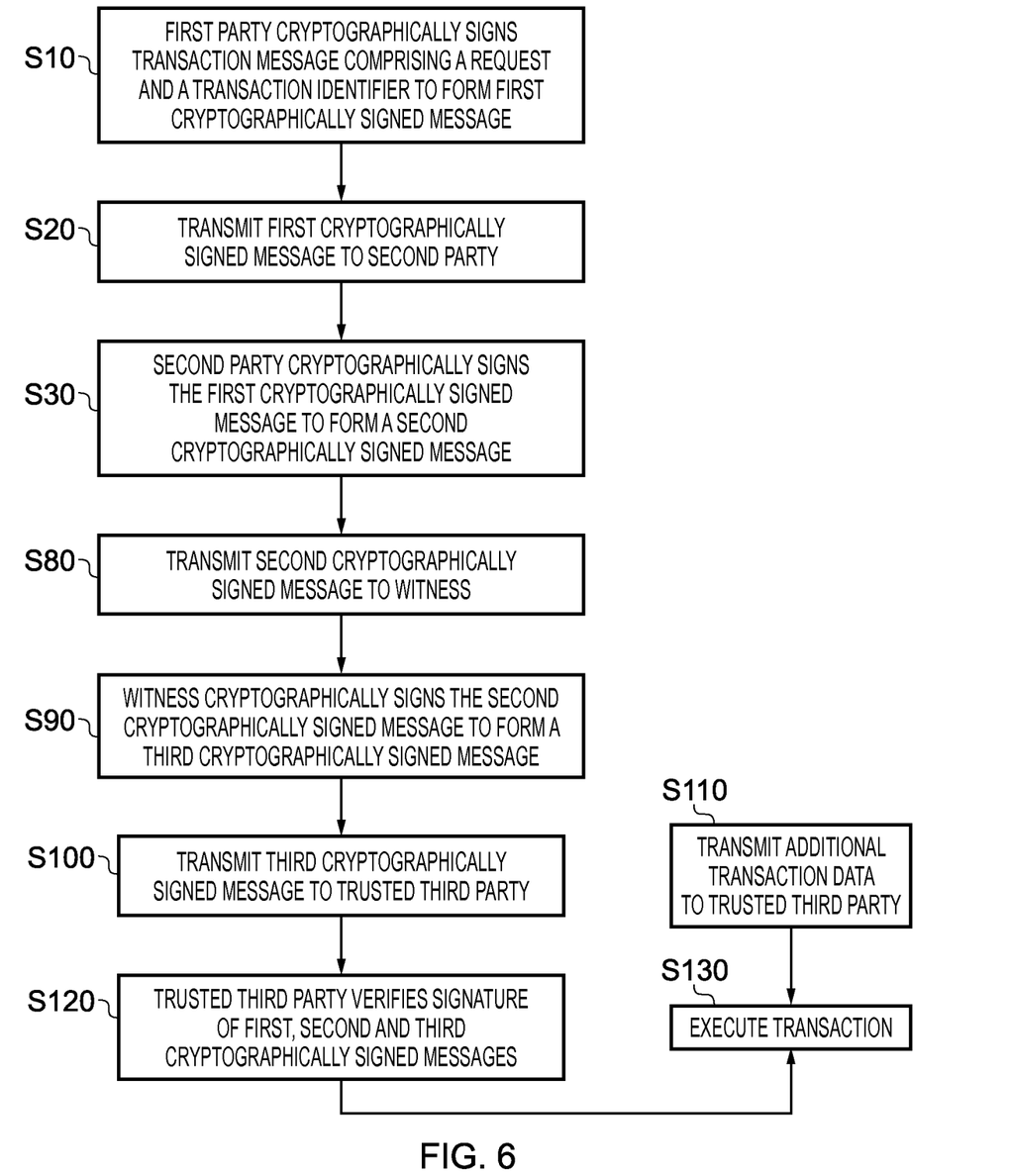
FIG. 6 is a flow diagram illustrating the steps performed by the system of FIG. 4.

FIG. 6 is a flow diagram illustrating the sequence of message transactions carried out by the system of FIG. 4.

In step S10, the first party 10 cryptographically signs a transaction message 160 comprising a request 164 and a transaction identifier 162 to form a first cryptographically signed message 50.

In step S20, the first cryptographically signed message 50 is transmitted to the second party 20.

In step S30, the second party 20 forms a second transaction message comprising the first cryptographically signed message 50 and then cryptographically signs the second transaction message to form a second cryptographically signed message 90.

In step S80, the second cryptographically signed message 90 is transmitted to witness 170.

In step S90, the witness 170 forms a third transaction message comprising the second cryptographically signed message 90 and then cryptographically signs the third transaction message to form a third cryptographically signed message 200.

In step S100, the third cryptographically signed message 200 is transmitted to the trusted third party 30.

In step S110, any additional transaction data 250 is transmitted to the trusted third party 30. This step is optional, since there may not be any additional transaction data 250 to be received.

In step S120, the trusted third party 30 verifies the signature of the first cryptographically signed message 50, the second cryptographically signed message 90, and the third cryptographically signed message 200.

In step S130, if the signatures are valid, and if sufficient data is available, then the transaction can be executed. Otherwise, the transaction may have been altered during transit and must either be abandoned or investigated as appropriate.

In accordance with the previously described embodiments, it is possible for a transaction between a first party 10 and a second party 20 to take place in such a manner that a record of the transaction can be prevented from being altered after the transaction has been agreed. The record of the transaction is singed by both the first party 10 and the second party 20, thereby making it difficult for any party to alter the transaction after its been agreed to. Furthermore the act of the first party 10 and the second party 20 both signing the record of the transaction ensures that it can be verified that the transaction was agreed to by both the first party 10 and the second party 20.

A witness 170 can also be used to add an additional signature to the record of the transaction thereby providing an additional level of security. The record of the transaction may arrive at the trusted third party by a number of routes, thereby providing assurances to the parties involved that the record of the transaction cannot be altered after an agreement has been reached. It is also possible for an element of anonymity of the various parties to be preserved, since there is no need for either the first party or the second party to provide any kind of identification. Accordingly, the transaction can be conducted without either the first party or the second party knowing the identity of the other party. However, the original transaction remains secure and enforceable, since the identity of both the first party and the second party may be implicitly known to the trusted third party. Accordingly, if the transaction is not carried through, i.e. if the seller fails to provide the goods/service or the buyer's funds are not sufficient, it is possible to prove that the transaction was authorised and that, therefore, the transaction should be enforced, e.g. by a court.

Any additional party that eavesdrops on transactions carried out by the first party or the second party will be unable to determine the identities of the parties and will be unable to determine either any purchasing pattern or spending pattern of the parties since there is no means to identify the parties involved in the transaction without the assistance of the trusted third party 30.

It will be appreciated that the various circuitry and method steps set out above may partially or completely be performed be general purpose computing hardware operating under control of appropriate software.

It will be further appreciated that such hardware and software may be implemented in a variety of forms, including remote servers, desktop computers, personal mobile devices such as phones, wallet-friendly credit card sized devices, or worn devices such as wristwatches. The latter categories of portable and worn devices offer further benefits in that they may be additionally configured to verify that they are being used by the authorised individual before engaging in any transaction. This may be by authentication means including PIN codes and biometric authenticators, or proximity-detecting means such as detection of subcutaneously implanted radio transponders. Such verification of the presence of the authorised user, performed by a device that is physically and logically resistant to modification and nefarious countermeasures, may increase the level of confidence a court of law has in the veracity and validity of the transaction and the parties engaging in it to a degree that they will find it very difficult to refute, to the point that the trusted third party may feel able to underwrite the transaction with guarantees or credit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A machine-implemented method for authenticating electronic messages exchanged between a first electronic device and a second electronic device, the method comprising:

a first signing step in which a first cryptographic signature is applied to a first electronic message comprising a request and a message identifier by said first electronic device to form a first cryptographically signed message;

a first transmitting step in which said first cryptographically signed message is transmitted as a signal from said first electronic device to said second electronic device;

a second signing step in which said second electronic device:
  forms a second electronic message that comprises the first cryptographically signed message, and
  applies a second cryptographic signature to the second electronic message to form a second cryptographically signed message;

a second transmitting step in which said second cryptographically signed message is transmitted as a signal from said second electronic device to said first electronic device;

a third transmitting step in which said second cryptographically signed message is transmitted as a signal from the first electronic device and from the second electronic device to a trusted third electronic device for authentication, wherein the first electronic device does not locally verify that the second cryptographically signed message was signed by the second electronic device, and wherein the second electronic device does not locally verify that the first cryptographically signed message was signed by the first electronic device;

a first verification step in which said trusted third electronic device verifies that said second cryptographically signed message received as a signal from the first electronic device, and said second cryptographically signed message received as a signal from the second electronic device, was cryptographically signed by said second electronic device;

an extracting step in which the trusted third electronic device extracts the first cryptographically signed message from the second cryptographically signed message;

a second verification step in which said trusted third electronic device verifies that said first cryptographically signed message extracted from said second cryptographically signed message received as a signal from the first electronic device, and said first cryptographically signed message extracted from said second cryptographically signed message received as a signal from the second electronic device, was cryptographically signed by said first electronic device; and a request execution step in which, in response to positive verifications from said first verification step and said second verification step, said trusted third electronic device manages execution of said request specified within said second cryptographically signed message.

2. The method according to claim 1, further comprising:
a first presence detecting step in which a physical presence of a first authorised user is detected by said first electronic device prior to said first signing step.

3. The method according to claim 1, further comprising:
a second presence detecting step in which a physical presence of a second authorised user is detected by said second electronic device prior to said second signing step.

4. The method according to claim 1, wherein said plurality of parties are respective independent sources for a plurality of routes for said second cryptographically signed message to reach said trusted third electronic device.

5. The method according to claim 1, wherein said request execution step takes place in dependence on a predetermined condition being met.

6. The method according to claim 1, wherein said third transmitting step is performed by at least one of said first electronic device and said second electronic device.

7. The method as claimed in claim 1, wherein at least one of said first electronic device and said second electronic device provide to said trusted third electronic device additional information separate from said second cryptographically signed message to further specify said request.

8. The method as claimed in claim 1, wherein said execution of said request is performed as an atomic operation.

9. The method as claimed in claim 8, wherein said atomic operation is performed using a two-phase commit protocol.

10. The method as claimed in claim 1, wherein said request is a transfer of a monetary amount between said first electronic device and said second electronic device.

11. The method according to claim 1, wherein said first electronic message comprises a payload.

12. The method according to claim 11, wherein said payload comprises encrypted data; and said trusted third electronic device stores a decryption key for decrypting said encrypted data.

13. The method according to claim 12, further comprising:
a resolution step in which said decryption key is transmitted to said second electronic device by said trusted third electronic device in response to positive verifications from said first verification step and said second verification step.

14. The method according to claim 1, wherein said message identifier is generated using a random or pseudo-random number generator.

15. The method according to claim 1, wherein said first cryptographically signed message comprises a unique identifier for said first electronic device.

16. The method according to claim 15, wherein said unique identifier for said first electronic device is selected by said first electronic device from a first plurality of unique identifiers.

17. The method according to claim 1, wherein said second cryptographically signed message comprises a unique identifier for said second electronic device.

18. The method according to claim 17, wherein said unique identifier for said second electronic device is selected by said second electronic device from a second plurality of unique identifiers.

19. The method according to claim 1, wherein said second electronic device verifies that said first cryptographically signed message was cryptographically signed by said first electronic device.

20. The method according to claim 1, wherein said first electronic device verifies that said second cryptographically signed message was cryptographically signed by said second electronic device.

21. The method according to claim 1, further comprising:
a witnessing step in which a witness receives said second cryptographically signed message and cryptographically signs said second cryptographically signed message to form a third cryptographically signed message;
and a witness verification step in which said trusted third electronic device verifies that said third cryptographically signed message was cryptographically signed by said witness, wherein said second cryptographically signed message is transmitted to said third trusted electronic device as part of said third cryptographically signed message.

22. The method as claimed in claim 21, wherein said witness is one of said plurality of parties and transmits said third cryptographically signed message to said trusted third electronic device.

23. The method according to claim 1, wherein said first signing step uses a first private key from a first public/private key pair;
and said second signing step uses a second private key from a second public/private key pair said first verification step uses a first public key from said first public/private key pair;
and said second verification step uses a second public key from said second public/private key pair.

24. A system for authenticating electronic messages comprising:
a first electronic device comprising:
first signing circuitry configured to apply a first cryptographic signature to a first electronic message comprising a request and a message identifier to form a first cryptographically signed message;
first transmitting circuitry configured to transmit as a signal said first cryptographically signed message to a second electronic device;
said second electronic device comprising:
second signing circuitry configured to form a second electronic message that comprises the first cryptographically signed message, and apply a second cryptographic signature to said second electronic message to form a second cryptographically signed message;
second transmitting circuitry configured to transmit as a signal said second cryptographically signed message to said first electronic device;
and a trusted third electronic device comprising:
receiving circuitry configured to receive said second cryptographically signed message transmitted as a signal from the first electronic device and from the second electronic device for authentication, wherein the first electronic device does not locally verify that the second cryptographically signed message was signed by the second electronic device, and wherein the second electronic device does not locally verify that the first cryptographically signed message was signed by the first electronic device;
first verification circuitry configured to verify that said second cryptographically signed message received as a signal from the first electronic device, and said second cryptographically signed message received as a signal from the second electronic device was cryptographically signed by said second electronic device;
extraction circuitry configured to extract the first cryptographically signed message from the second cryptographically signed message;
second verification circuitry configured to verify that said first cryptographically signed message extracted from said second cryptographically signed message received as a signal from the first electronic device, and said first cryptographically signed message extracted from said second cryptographically signed message received as a signal from the second electronic device, was cryptographically signed by said first electronic device;
and request executing circuitry configured to execute said request specified by within said second cryptographically signed message in response to positive verifications from said first verification circuitry and second verification circuitry.

25. An apparatus for verifying validity of electronic messages exchanged between a first electronic device and a second electronic device comprising:

receiving circuitry configured to receive as signals, from the first electronic device and from the second electronic device, a second cryptographically signed message comprising a first cryptographically signed message comprising a request and a message identifier, wherein the first cryptographically signed message is formed by the first electronic device by applying a first cryptographic signature to a first electronic message comprising the request and message identifier, and wherein the second cryptographically signed message is formed by the second electronic device by forming a second electronic message comprising the first cryptographically signed message, and applying a second cryptographic signature to the second message, and;

first verification circuitry configured to verify that said second cryptographically signed message received as a signal from the first electronic device, and said second cryptographically signed message received as a signal from the second electronic device, is cryptographically signed by said second electronic device;

extraction circuitry configured to extract the first cryptographically signed message from the second cryptographically signed message;

second verification circuitry configured to verify that said first cryptographically signed message extracted from said second cryptographically signed message received as a signal from the first electronic device, and said first cryptographically signed message extracted from said second cryptographically signed message received as a signal from the second electronic device, is cryptographically signed by said first electronic device;

request executing circuitry configured to execute said request specified within said second cryptographically signed message in response to positive verifications from said first verification circuitry and second verification circuitry.

* * * * *